(12) United States Patent
Barrett

(10) Patent No.: US 9,298,830 B2
(45) Date of Patent: Mar. 29, 2016

(54) METHOD, SYSTEM AND APPARATUS FOR FACILITATING DISCOVERY OF ITEMS SHARING COMMON ATTRIBUTES

(71) Applicant: Timothy Alan Barrett, Pymble (AU)

(72) Inventor: Timothy Alan Barrett, Pymble (AU)

( * ) Notice: Subject to any disclaimer, the term of this patent is extended or adjusted under 35 U.S.C. 154(b) by 463 days.

(21) Appl. No.: 13/875,148

(22) Filed: May 1, 2013

(65) Prior Publication Data

US 2014/0330841 A1    Nov. 6, 2014

(51) Int. Cl.
*G06F 17/30* (2006.01)

(52) U.S. Cl.
CPC .................. *G06F 17/30864* (2013.01)

(58) Field of Classification Search
USPC ........................................................ 707/748
See application file for complete search history.

(56) References Cited

U.S. PATENT DOCUMENTS

| | | | |
|---|---|---|---|
| 5,802,361 A * | 9/1998 | Wang ................ | G06F 17/30256 379/202.01 |
| 5,986,673 A | 11/1999 | Martz | |
| 6,486,898 B1 | 11/2002 | Martino et al. | |
| 6,801,229 B1 | 10/2004 | Tinkler | |
| 7,120,646 B2 | 10/2006 | Streepy, Jr. | |
| 7,343,365 B2 | 3/2008 | Farnham et al. | |
| 7,689,525 B2 | 3/2010 | Drucker et al. | |
| 7,792,868 B2 | 9/2010 | Finkelstein et al. | |
| 8,165,406 B2 * | 4/2012 | Tan ...................... | G06K 9/6215 382/100 |
| 8,296,667 B2 | 10/2012 | Tewari et al. | |
| 2003/0009469 A1 * | 1/2003 | Platt ................... | G06F 17/30038 |
| 2007/0214179 A1 | 9/2007 | Hoang | |
| 2007/0234234 A1 | 10/2007 | Leidig et al. | |
| 2008/0163118 A1 | 7/2008 | Wolf | |
| 2012/0011129 A1 * | 1/2012 | Van Zwol ......... | G06F 17/30864 707/748 |
| 2012/0056893 A1 * | 3/2012 | Nakajima ......... | G06F 17/30256 345/582 |
| 2014/0096056 A1 * | 4/2014 | Latzina .................... | G06F 17/30 715/771 |

FOREIGN PATENT DOCUMENTS

WO    WO2010038279    7/2010

* cited by examiner

*Primary Examiner* — Jay Morrison
(74) *Attorney, Agent, or Firm* — Federico Fraccaroli

(57) ABSTRACT

In accordance with example embodiments, the present application discloses at least a method, a system and an apparatus apt to facilitate the browsing, the discovery, and the usage of items. In one embodiment, items share a plurality of common attributes and can be arranged and displayed according to degrees of commonality.

20 Claims, 10 Drawing Sheets

| UniqueID (301) | Title (302) | Description (303) | Image (304) | Rating (305) | Genres (306) | Directors (307) | Studios (308) |
|---|---|---|---|---|---|---|---|
| "9321337017 372.2" | "The Big Blue" | There is a place on our planet which is stranger than any other – the least known and most mysterious. It is a juncture not unlike outer space, where conventional notions of time and distance evaporate. It is a magical and dangerous place to which the human body, as well as the human spirit, must adapt. It is the only place where a man named Jacques Mayhol truly feels at home. It is the sea "The Big Blue" | "9321337 017372.2 f.jpg" | 7.9 | Drama | "Luc Besson" | "Twentieth Century Fox", "Gaumont", "Les Films Du Loup" |
| "9321337029 320.2" | "Ladyhawke" | "The magical legend of an unforgettable love. The story of a love that can never be consummated. He is a wolf by night and she, a hawk by day destined never to meet in human form, unless they can reverse the evil spell cast upon them. An exciting, action-packed suspense adventure." | "9321337 029320.2f. jpg" | 6.8 | "Fantasy", "Adventure", "Romance" | "Richard Donner" | "Twentieth Century Fox", "Warner Bros. Pictures" |

330

| UniqueID (321) | Title (322) | Description (323) | Image (324) | Rating (325) | URL (326) | Price (327) | Category (328) | Brand (329) |
|---|---|---|---|---|---|---|---|---|
| "201220_0014 _35t" | "All-Clad Copper Core Chef's Pan" | " Elite chefs depend on All-Clad's Copper Core cookware because of its superb responsiveness to heat. Designed with a shallow, broad shape, this pan is perfectly suited for cooking sauces, soups and risottos while evenly dispersing heat to prevent scorching." | http://rkv.ws imgs.com/w simgs/rk/im ages/dp/wc m/201220/0 014/img35t. jpg | 5.0 | http://www.william s-sonoma.com/produ cts/all-clad-copper-core-12-inch-chefs-pan/?pkey=ccookw are=copper | "624.70" | "Kitchen", "Cookware", "Frying Pan" | |
| "201220_00 88t" | "Mauviel M365 Copper Paella Pan" | This copper and stainless-steel pan produces an exceptional infusion of flavors (one of the secrets to paella's characteristic richness and depth of flavor). It is crafted in France by Mauviel, a family-owned maker of fine copper cookware since 1830. | "201220_00 32_img88tj pg" | 3.0 | http://www.william s-sonoma.com/produ cts/mauviel-m365-15-inch-copper-paella-pan/?pkey=cbakew are-baking-dish | 125.60 | "Kitchen", "Cookware", "Paella Pan" | "Mauviel" |

METHOD, SYSTEM AND APPARATUS FOR FACILITATING DISCOVERY OF ITEMS SHARING COMMON ATTRIBUTES

TECHNICAL FIELD

The present application generally relates to a system, a method and an apparatus to provide users with the capability to discover correlated items within a set of items.

BACKGROUND

The teachings of patent applications US2006155684A1, US2007220045A1 and PCT/US2010/038279 are incorporated herein by reference in their entirety. Furthermore, where a definition or use of a term in a document, which is incorporated by reference, is inconsistent or contrary to the definition of that term provided herein, the definition of that term provided herein applies and the definition of that term in the reference does not apply.

The value of a search engine depends on the relevance of the results it produces. While there are numerous web pages that comprise a particular word or phrase, some pages may be more relevant, popular, or authoritative than others. Search engines employ different and proprietary methods to rank the results.

Web search engines store information about many web pages, which they recover from the page's HTML. These pages are retrieved by a crawler, also known as a spider, which follows every link on the site. When a user enters keywords into a search engine, the engine examines its index and provides a listing of matching pages according to its algorithms and criteria, usually by way of a digest containing the document's title and sometimes parts of the text.

Data about web pages is stored in an index database for use in later queries. The purpose of an index is to allow information to be retrieved as quickly as possible. The index is built from the information stored with the data. The engine looks for the words or clusters of words as entered. Some search engines provide features such as proximity search, which allows users to define the distance between keywords. There is also concept-based searching where the research involves using statistical analysis on pages containing specific keywords or phrases.

How a search engine decides which pages are the best matches, and what order the results should be shown in, varies widely from one search engine to another. There are two main types of search engines that have evolved: 1) a system of predefined and hierarchically ordered keywords that humans have programmed extensively and 2) a system that generates an "inverted index" by analyzing texts it locates.

Search engines rely on metadata that are strings of data or text associated with a particular webpage. Usually a user has an idea of what he is looking for and uses keywords to guide the search engine in retrieving web pages. If those keywords are present in metadata associated with a webpage and said webpage ranks high in the search engine index, then the webpage will be displayed more prominently as compared to other web pages also related to said search.

There are software applications that provide some sort of discovery capabilities by associating items in a finite set such as Discovr or Liveplasma. These systems operate according to a model whereby each item in the data set is connected to a small number of other items. These associations are illustrated by having each item showing lines connected to similar items.

SUMMARY

The present invention, in its various embodiments, discloses a plurality of novel methods, systems and apparatuses to facilitate discovery of items sharing common attributes.

According to a first aspect of the present invention an apparatus is disclosed, said apparatus comprising hardware components, memory storage components and software instructions stored therein. Said hardware, memory and instructions adapted to perform the following: 1) determining a degree of correlation by means of a correlation algorithm between items belonging to a finite set of items wherein each item has at least an associated visual indicia and at least a set of attributes that are common to every other item belonging to said finite set of items to facilitate discovery of said items within said finite set; 2) generating an aggregate score representative of said degree of correlation of at least one attribute of every item against all other said items belonging to said finite set via a weighting algorithm; 3) causing the display of at least one reference item among said finite set of items via its associated visual indicia; and 4) causing the display of a plurality of additional items belonging to said finite set of items via their associated visual indicia according to a representation criterion wherein said representation criterion is indicative, at least in part, of said aggregate score.

According to a second aspect of the present invention, a machine implemented method is disclosed, said method comprising: 1) determining a degree of correlation by means of a correlation algorithm between items belonging to a finite set of items wherein each item has at least an associated visual indicia and at least a set of attributes that are common to every other item belonging to said finite set of items to facilitate discovery of said items within said finite set; 2) generating an aggregate score representative of said degree of correlation of at least one attribute of every item against all other said items belonging to said finite set via a weighting algorithm; 3) causing the display of at least one reference item among said finite set of items via its associated visual indicia; and 4) causing the display of a plurality of additional items belonging to said finite set of items via their associated visual indicia according to a representation criterion wherein said representation criterion is indicative, at least in part, of said aggregate score.

According to a third aspect of the present invention, a computer software system is presented, said system having a set of instructions formed into each of a plurality of modules, each modules comprising: 1) a process for determining the degree of correlation by means of a correlation algorithm between items belonging to a finite set of items wherein each item has at least an associated visual indicia and at least a set of attributes that are common to every other item belonging to said finite set of items to facilitate discovery of said items within said finite set; 2) a process for generating an aggregate score representative of said degree of correlation of at least one attribute of every item against all other said items belonging to said finite set via a weighting algorithm; 3) a process for causing the display of at least one first reference item among said finite set of items via its associated visual indicia; and 4) a process for causing the display of a plurality of additional items belonging to said finite set of items via their associated visual indicia according to a representation criterion wherein said representation criterion is indicative, at least in part, of said aggregate score.

BRIEF DESCRIPTION OF THE DRAWINGS

For a more complete understanding of example embodiments of the present invention, reference is now made to the following descriptions taken in connection with the accompanying drawings in which:

FIG. 3 illustrates exemplary embodiments of datagrams containing data records;

DETAILED DESCRIPTION OF THE DRAWINGS

Figure 1:
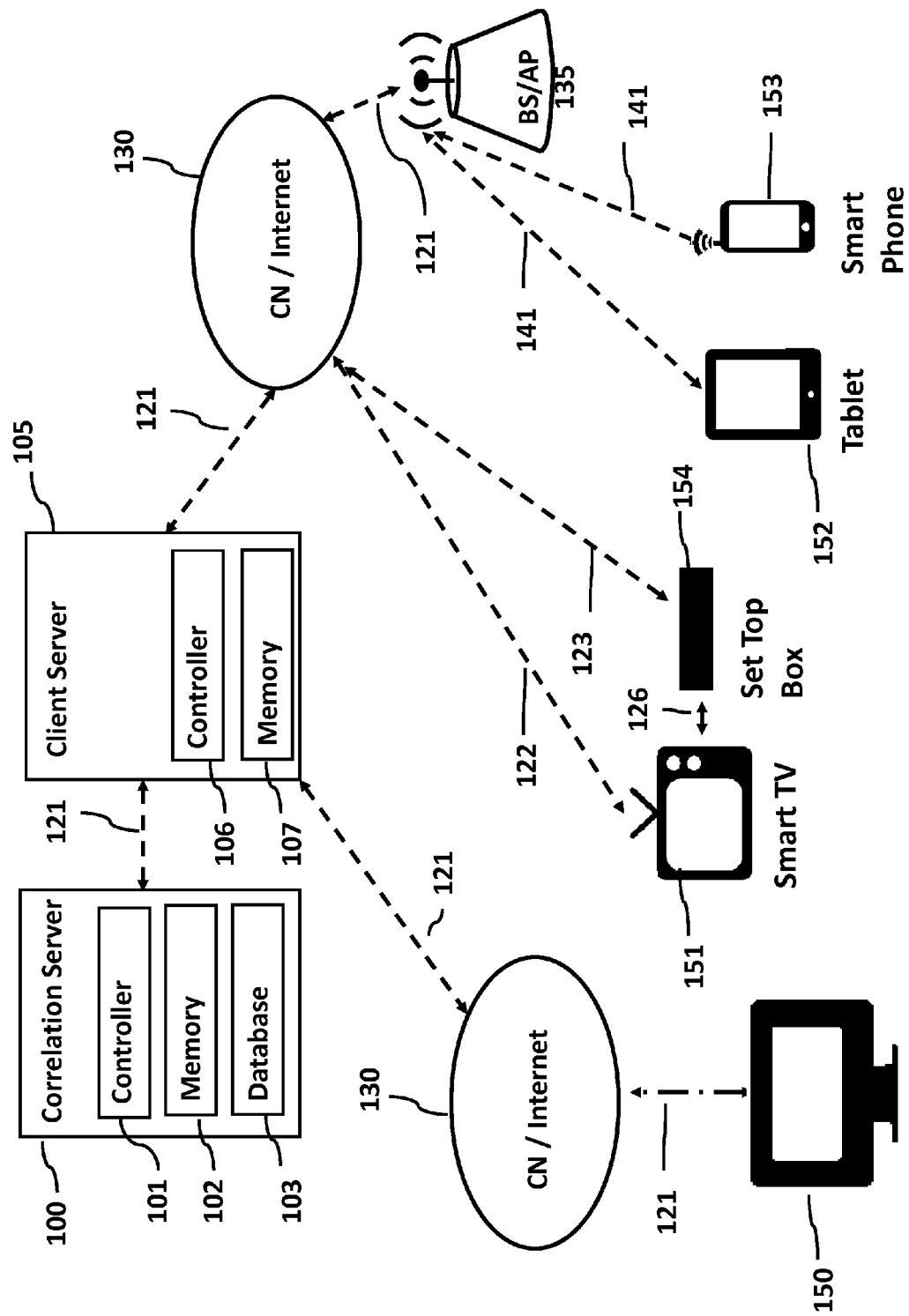
FIG. 1 is an exemplary schematic representation of a system describing a possible interactions between servers and terminals.

An example embodiment of the present invention and its potential advantages are understood by referring to FIGS. 1 through 10.

Traditional search systems are designed assuming a user has in mind what he or she is looking for. In one embodiment, the present invention provides a substitute for such traditional searches especially when a user may not be familiar with keywords in a certain field. Using the correlation of items and the display of visual indicia representing those items, a user is presented with visual cues that provide an opportunity to explore new paths and discover end points that would not occur with a traditional search. In one possible embodiment, visual indicia may be visual elements that can describe at least one attribute of the item to the user. For example, an image, an icon, some text, an animation, a video, other mechanism or combination thereof, that may visually represent the item on a display.

Traditional searches are analogous to going to a shop to buy a particular item. In this instance, a person has an idea of what they want, and looks to find a specific item. The discovery process, enabled by one of the possible implementations of this invention, is closer in nature to walking into a shop because it looks interesting, and browsing around looking at what is available, or alternatively, to going to a video store to find something interesting to watch. This discovery process may involve processing vast amounts of visual information and potentially having a plurality of items catching a user's attention. This invention, in a possible implementation, provides a mechanism that resembles the described above browsing and discovery process on a display or any means to convey a visual representation of a set of items.

A set of items, in one possible embodiment, is a collection of data objects defined by a common set of attributes describing characteristics that generally may apply to all items in that data set. For example, wine could be described by a set of data attributes that could include Style, Color, Age, Price, Region, Rating, Age, etc. Each of these attributes may apply to any wine, and therefore any collection of data for wines that included data for these attributes would constitute a valid "Set of Items" for the purpose of the system. The system may be applied to a wide variety of data sets. Exemplary embodiments may include, though not be limited to, implementations involving any retail items, real estate, wine, food, video, audio, image or book collections, stocks, data visualization, recipes, collectables, computer files and documents, applications, people, or places.

In one embodiment, an attribute is an element of data that describes a facet of an item. Attributes of an item may take several different forms including:

1) Common/Descriptive attributes such as Unique Identifier, Title Description and Image references 2) Correlation Attributes are attributes of an item used by the system to establish a degree of correlation score between items. This could be any attribute that contains data that may be determined be similar in some way between two items. Examples may include a list of Actors in a movie, a price or the Bouquet of a wine. In one embodiment, the degree of correlation between two items is measured by a correlation algorithm, which assigns a numeric value to each of the similarities found between said items' correlation attributes.

3) Modification Attributes that are numeric attributes that are used to modify the overall correlation is some way to enhance an item's prominence on the display. This may include, for example, a popularity rating that is independent of the Correlation Attributes, though, in one embodiment, may be multiplied by the correlation score to ensure that more popular items are displayed more prominently on the display.

Each of these attribute types are discussed in more detail hereafter. In one embodiment, the system defines and illustrates the relationships between a core, "Reference" item or items, and an additional set of items associated with said reference item(s). A "reference" item (or items) refers to elements of the full set of items that have been selected by the user of the client terminal to be central to the system search. In one embodiment, additional items can be a set of items for which summary information may be sent to the client terminal, that are at least in part associated with the reference item. Any items displayed on the client terminal that are not reference items would be considered additional items.

In one embodiment, when an initial screen is displayed, an initial reference item may also be selected by the system. In another embodiment, the initial screen need not have a reference item, with the initial reference item being selected by the user from the items displayed on the initial screen. When a new reference item is selected, the system may perform a search against the attributes of that item to find results that are related in some way with that reference item. Each time a new reference item is selected, the correlation system may regenerate a list of items that may be correlated in some way with the newly selected reference item.

As each item is essentially correlated against each other item in the system, the set of items is usually finite, and all items may share, at least partially, the same attributes to allow correlation. With the availability of modern indexing technologies correlations and associations may continuously and automatically be created as new items become available.

In one embodiment, the system may include more than one different but related sets of items. At least one for the purpose of providing items to search against that may be selected as reference items, and a an additional set or sets of items that contain references to the first set(s) of items. For example, the first set of items could be ingredients used in cooking, and a second set of items could be related recipes using said ingredients. Such an implementation would require a different selection process for the reference items than is described hereafter. In this instance, the selection process for the reference items may be through a traditional search, while the results of the search may be displayed in the fashion described hereafter.

In one embodiment of the present invention, discovery and browsing capabilities are provided through visual cues. In this embodiment, each element in the set of elements may have at least an associated image or visual indicia for representation on the display. The image can be, for example, a product picture or cover art. It can also be specifically designed to convey more of the information about the item it represents, being constructed to represent the key attributes of the item with visual elements such as such as logos, graphs, colors, shapes, animations or small amounts of text in addition to regular images. Visual indicia may be automatically or manually associated to an item according to different algorithms.

In one embodiment, the system could be used as a mechanism to browse and discover files in a file system on a computer. As files were created or added to the computer, the system may generate attribute data and attributes associated with said files to allow browsing by the system.

In a possible embodiment of this invention, determining correlations among items will be made possible by the use of a common set of attributes. In a possible embodiment, attributes can be a series of characteristics describing each item within a set of items that share said characteristics. Each item in a set of items can be defined by shared or common attributes; hence, a common set of attributes can define a set of items.

As an example, wines can be described by a set of data attributes such as Style, Color, Age, Price, Region, Rating and Age, etc. Each item in the set of data would have at least a placeholder for data for each of these attributes, though it may be possible for an item to have no data for a particular attribute.

In a possible embodiment, the degree of correlation is a measure of the similarities between items. This degree of correlation between items may be assessed by a correlation algorithm, which may assign a numeric value for the similarities found between each attribute of each item. In one embodiment, the system may use an aggregate score of all the correlation values determined by the correlation algorithm. This aggregate score illustrates the overall degree of correlation between two items.

In one embodiment, in order to make the aggregate score useful, and appropriate weight must be given to each attribute in generating said aggregate score. Assuming the appropriate weight of each attribute, the aggregate score allows the similarities between items to be independently assessed across the full data set. In one embodiment, the "weighting algorithm" uses a numeric value that may be applied to the correlation score for an attribute in order to increase or reduce its significance in the aggregate correlation score between items. In one embodiment, the weight may be applied by multiplying the existing correlation score by the weight value. There may also be a default system weight for each attribute, and additional weights applied based on user settings for each search.

In addition to the set of Correlation Attributes that may be unique to a particular set of items, there are also Common/Descriptive Attributes that may be used by the system, and will be common to any set of items. Data for these attributes, such as the Unique Identifier, may not exist and may have to be created, as they are required for the system to function. These common attributes may include for example:

1) A Unique Identifier to identify the item within the set of items.
2) A visual indicia that is used to represent the item on the client screen.
3) A Title (Textual name of the item).
4) A Description (Text describing the item).

Data within the Image, Title and Description, may or may not form part of the item correlation.

In a possible embodiment, in addition to the descriptive attributes, a range of data defining each item can be used to determine correlations and relationships between the items. For example, for a movie catalog this could include at least attributes such as Actors, Genres, Writers, Directors, Studios, Ratings, Rating Age.

In one embodiment of the invention, the system may determine correlation between any two items within the finite set of items by using an algorithm that assigns a value to the similarities between attributes of each item in the data set. The data set used in the system can be considered inherently finite as each item is correlated against each other item, so while a data set may be large, for all practical purposes is finite. As the set may have items removed, or new items that did not exist before added over time, in that regard it may considered theoretically infinite.

Relationships between items in this system can be determined by a large number of complex associations of attributes beyond simple search associations, including the weighting of each attribute, the determining of values for ordered lists, the determining of being within predetermined ranges, etc.

A correlation algorithm can be used to calculate the correlation between items. Correlations between attributes can be calculated differently depending on the nature of the attribute. In some cases, a simple textual match of attributes, such as in a traditional search may suffice to indicate some degree of correlation. For example, a Wine type may be one of a relatively small number of values such as "Red", "White" or "Rose" so a simple text match may be appropriate.

In other cases, for more complex attributes, such as Bouquet, for example, there may be several characteristics that could be listed in order of significance to describe a wine. In this instance, the order in which the elements of this attribute appear must be taken in to account in generating the overall score. For example, if the elements of the "Bouquet" attribute were "Fruit", then "Spice", then matches with other wines that had a "Fruit" bouquet, would be considered more significant than those with only "Spice". A wine that had the identical elements in the attribute, in the same order would result in the strongest possible correlation for that attribute. The significance of the attribute, such as "Bouquet", to the aggregate score also needs to be considered to ensure that it lends an appropriate weight to the said aggregate score.

In one embodiment, each item, represented by its visual indicia on the display, represents all the data contained within its attributes. When a user selects a reference item for search, the result can be generated by comparing attributes of the reference item with every other item in the set, returning a set of matches based on an overall aggregate score across all attributes. The system may also use a set of algorithms to compare each of the attributes and apply a weight to each in determining the result. The numerical value generated may represent the correlation between each item to each other item within the set.

In one implementation of this invention, this system is built around the creation of a full display of items based on an aggregated score of all attributes that relate to the reference items. Updating the reference item may generate new relationships among items. However, this system is not only for the display of related items or strongly related items, but also items that are unrelated or related in non-traditional ways.

In some cases there might be no match or correlation at all. However, when there is match, in one implementation, a value can be assigned based on the strength of the match. Said value can be then multiplied by a predetermined weight for each attribute to normalize the scores across all attributes. This process in the present application is sometimes referred to as "weighting".

There are several different ways in which the attributes can contribute to an overall correlation score. The simplest mechanism is to add its raw score to the aggregate correlation score. This raw correlation score for an attribute may also be multiplied by, or be added to a default weight for that attribute before adding it to the overall score. An additional weight value may also be applied to either of these values based on the user settings or other dynamic factors in the system, such as time of day, or a desire of the system operator to promote items with particular attributes.

In one implementation, weighting can be assigned prior to correlating the data and can be applied every time a user selects a new reference item or a new search is performed. In another implementation the system may allow the user to directly or indirectly adjust parameters associated with the weight assigned to each attribute. In this case, the final numerical values representing correlations between all items may be calculated only after applying weight parameters defined by the user from the client device. In one implementation, to increase performance, common items or common parameters, such as default values, may be pre-calculated and/or cached by the system.

In one implementation, each attribute can be categorized having a default weight assigned that represents the significance of the attribute, or how it affects the aggregate correlation score. This default weight value can be used to normalize the values for each attribute such that each attribute contributes a proportional amount to the overall correlation score. For example, each attribute score may be calculated to contribute between 0 and 100 points to the overall correlation score, though as each attribute's score is calculated differently, there may be different distributions of values and significance of the particular attribute that need to be taken into account. For example, there may be an attribute that defines if an item is "Black" or "White", a match could assign 100 points, and no match, 0 points. However, there may be other attributes of the item that are more significant to correlation than the color, that may also have a much broader distribution of possible results. The weight therefore may be assigned to each attribute to have its score better represent its real contribution to the correlation of items.

In one embodiment, an attribute of an item may be used in a similar way to weights to modify the overall score of the correlation rather than being used to match associated items. In this instance, the attribute is classified as a "Modification Attribute". For example, each item could be assigned an attribute defining its popularity, for example, as a score out of 10. If used as part of the correlation process, the system would rate items sharing a similar popularity value as being correlated. However, if used as a Modification Attribute, an item's popularity could be used as a multiplier to the overall correlation score, ensuring that more popular items would always be displayed more predominantly on the screen. By adjusting such an attribute dynamically, the system operator would be able affect the content the users see, while retaining the correlation aspects of the system.

In one embodiment, the system may use visual indicia such as an image placed at the center of the display as a focal point. Said visual indicia may represent a current reference item, with the other images being displayed so that there is a visual indication of a relationship to that item. For example, the proximity to the central image, representing a reference item, may represent the strength of association with said reference item.

In another embodiment, the system may work by allowing the selection of at least one of the items represented on a display, and having the additional items belonging to the same finite set, displayed in a manner that is representative, at least in part, of their correlation with the selected single or multiple reference items. In one embodiment, the user may select multiple reference items simultaneously as a key for the search and discovery process.

Reference items can be differentiated from other items on a display through mechanisms such as and not limited to, positioning on the screen, size, borders, shading or other effects such as being kept stationary while other elements are moving.

In a possible implementation, a first step in implementing one aspect of the invention is the creation of an attribute definition for the set of items, defining a type and potential weight for each attribute used in the correlation algorithm.

In a possible implementation, the definition of attributes for a data set may have the following form:

"titles":("Type":"Information","Name":"Title"},
"overviews": {"Type":"Information","Name":"Overview"},
"iconlist": {"Type":"Information","Name":"Image"},
"popularity": {"Type":"Weighting","Name":"Rating", "Weight":5.0},
"actors": {"Type":"OrderedList", "Weight":8.0},
"directors": {"Type":"OrderedList","Weight": 10.0},
"writers": {"Type":"OrderedList", "Weight":8.0},
"studios": {"Type":"UnorderedList", "Weight":2.0},
"genres": {"Type":"UnorderedList","Weight":3.0},
"price": {"Type":"RangeValueSlide", "Name":"Price", "Weight":7.0, "PercentageBand":.1, "BandsToCount": 3},
"ratingAges": {"Type":"ExplicitStringValue","Weight": 1.0}

In the example above, the "Type" field defines how an attribute is treated within the system, with the "Weight" field defining the default weight applied to that attribute within the system. The name in quotes at the start of each line represents the internal system name for the attribute, and where a "Name" field is specified, this may represent a name that would be displayed on the screen to the user when showing data for this attribute.

In one embodiment, attributes with a type "Information" may be considered to be for informational purposes only and not used in the correlation process. In another embodiment, they may be considered as part of the correlation process through, for example, matching text.

In one embodiment, an attribute such as "popularity" in the example provided above may have a type of "Weight". In one embodiment, this could define an attribute as being a "Modification Attribute", which is may not be used in the correlation process, rather being applied as a modifier to the overall correlation score to ensure that popular items are displayed more prominently.

In the example provided, attributes with type "OrderedList" or "UnorderedList" may have multiple entries and when determining correlations between items, points will be awarded for any matches between items. In the case of an "UnorderedList", the order of items is unimportant and any match is treated equally. For an "Ordered List" the order is important and matches of items at the top of the list are given more weight to those at the bottom.

In the example provided above, the attribute "price" has a Type of "RangeValueSlide" which could, in one embodiment, be used to capture correlation between items with a similar price. In this example, there are some additional details provided including "PercentageBand", which defines how close the price of two items needs to be to be considered to be correlated, and "BandsToCount" which defines how many percentage bands to consider when calculating a correlation score. In the example provided, the "PercentageBand" is 0.1, which implies if the prices of two items are within 10% of each other, the items will be considered to be strongly correlated. Secondly, a "BandsToCount" value of 3 means that if the values are within 3 times the "PercentageBand", i.e. within 30% of each other, then they will still be considered to correlated, though each band after the first is assigned a reducing correlation score by the system.

Finally, in this example, the attribute "ratingAges" has a Type of "ExplicitStringValue", which is used for attributes that may have a simple text match. This means the attribute has a single, simple value, such as "PG" meaning "Parental Guidance", or "MA" meaning "Mature Audiences" that will be identical for any similar item.

It should be evident to those skilled in the art that there are other possible types of data not illustrated, and several different ways to treat correlations for said data that are also not described. What is significant for this invention is not so much the specific implementation, rather the process of normalizing and weighting data to provide a valid comparative correlation score between all items in the full data set.

In one possible implementation, not all items in the full data set need be correlated against all others. This could, in one embodiment be achieved by grouping items based on an attribute value, assigning a fixed score to that match, and only correlating other attributes against items with that said explicit attribute value match.

In one implementation, associations between items in a finite set, indicates a degree of similarity based on a correlation score. A correlation score may be a single numerical value, calculated via an algorithm that compares correlation attributes of each item in the set of items, with each other item in the set, and by weighting the results of matches for each attribute according to a combination of pre-defined weights and other weights that may be manually determined by the user. In one implementation, the higher the aggregate score between two items, the stronger the association would be.

FIG. 1 illustrates an exemplary system implementation of some of the concepts described above. In this implementation, Correlation Server 100 and Client Server 105 specialize in performing different functions. The person skilled in the art will know that these functions can be combined into one server or can be further separated by using more than two servers. In fact. Client Server 105, here in charge of caching and load balancing, can be integrated with Correlation Server 100 or can be further fractioned as two or more separate servers.

In a possible embodiment, Correlation Server 100 is used as a correlation server and comprises at least a Controller 101, a Memory 102 and a Database 103. Memory 102 may contain a software program that ingests the data created in the process that will be described in FIG. 2 as Process 230. In one implementation, Process 230 enables the correlation of relevant attributes for each item in a finite set of items against the same attribute for each other item in the set. This data, stored in database 103, can be provided to Client Server 105 upon request. Controller 101 and Controller 106 can be used to implement all the processes enabled by software stored in Memory 102 and Memory 107. In this embodiment, Correlation Server 100 is connected to Client Server 105 via Link 121. Link 121, Link 122, and Link 123, can be a physical connection, a wireless connection, or any combination of those as long as capable of transporting digital information. In a possible embodiment, the entire system, including clients may be operated on a single network, such as in a corporate network environment.

In one embodiment, Correlation Server 100's primary function is to manage items' correlations. It may control the addition or deletion of records and it may maintain a correlation score for every correlated attribute for every item against each other item in the set. In one implementation, Correlation Server 100 has total visibility of the full data set. As the system can operate on sets of many items, the set of items sent a client device may not include all items in the system, and is therefore referred to as a subset. Of the items returned to the client by Client Server 105, not all of these are necessarily displayed, and this set may also be referred to as a subset of items.

In another embodiment, the Correlation Server 100 is responsible for extracting a subset of items from the full set of items and generating data summarizing these items. Correlation Server 100 can also provide a summary of the correlations between the attributes of the currently selected reference items and a newly generated subset of items.

In an instance where the generation of a new subset of items will result in the same subset of items, such as when the subset of items is equivalent to the full set of items, the generation step may be excluded and the existing subset, now coinciding with the full set, can be used again.

In a possible implementation, the Correlation Server 100, Client Server 105 and full data set may be included in a packaged client application. In another implementation, this function may reside on the server.

Both correlated and non-correlated results returned from the server may support filters or weights that are applied to fine-tune the results. For example, a filter can be applied so that no results match a specified criterion (e.g. "Western" as a film category), or weight could be applied to an attribute such as "Wine Growing Region" in a search for wine, such that it becomes the most important factor in determining correlation.

The Correlation Server database 103 may be an in-memory data structure or can be stored on disk.

As an illustration, Correlation Server 100 can perform functions such as:
  Add an Item
  Remove an Item
  Return Commonality Data between one item and another
  Return full details for an individual item
  Return summary data for a predetermined or specified number of items for a given initialization criteria
  Return summary data for predetermined or specified number of items based on at least one reference item
  Return summary data as above for a fixed number of items, with an addition number of items chosen for a reason other than based on correlation with the reference item(s). These could be: 1) items selected at random, 2) matching a specified criteria or filter, 3) Weighted according to factors other than correlation, such as popularity, or a combination of factors as described hereafter in the FIG. 3 description.

In one embodiment, the role of the Client Server 105 is to take the correlation and summary data provided by the Correlation Server 100, and use this to build an ordered list of items to return to the client devices. This ordered list, is sometimes referred to as an "ordered subset", is then used by the client devices to determine the order in which the items are represented on the display. The number of items displayed from the ordered list may be determined by several factors including but not limited to the form factor of the display, user preferences, and the degree to which the user has zoomed in on the current display.

Client devices, in this application sometimes referred also as user or terminal devices may include devices such as PC 150, Smart TV 151, Tablet 152, Smart Phone 153, Set Top Box 154, or any other devices with display capabilities, processing capability and in some embodiments, connectivity capability. Devices can be connected to an IP network depicted in FIG. 1 as Core Network/Internet 130 via data links such as Link 121, 122, 123, or via Link 141 and Link 142. Link 141 and 142 can be wireless links such as, but not limited to, WiFi, Wimax or LTE. Link 126 illustrates a video connection between a Set Top Box 154 and a TV, such, but not limited to, composite video or HDMI.

In case of a wireless connection, BS/AP 135 may enable the connection of these devices to the IP network. BS/AP 135 can be a WLAN access point working according to the standard 802.11 or a WIMAX access point, working according to the standard 802.16. BS/AP 135 can also be a base station working according, including but not limited to, the WCDMA, CDMA, LTE, GSM, EDGE or GPRS standard as mere examples.

In a possible embodiment, the entire system, including the correlation and data functions, and the data itself can all be combined in an application running on the client device. Changes to the full dataset may, in one embodiment, be pulled from an external source by the client application. In another embodiment, changes can be pushed from an external source to the client application. In an embodiment where the entire system and data is packaged together on the client device, network connectivity may only be necessary in the event that the data set needs to be updated in some way.

Figure 2:
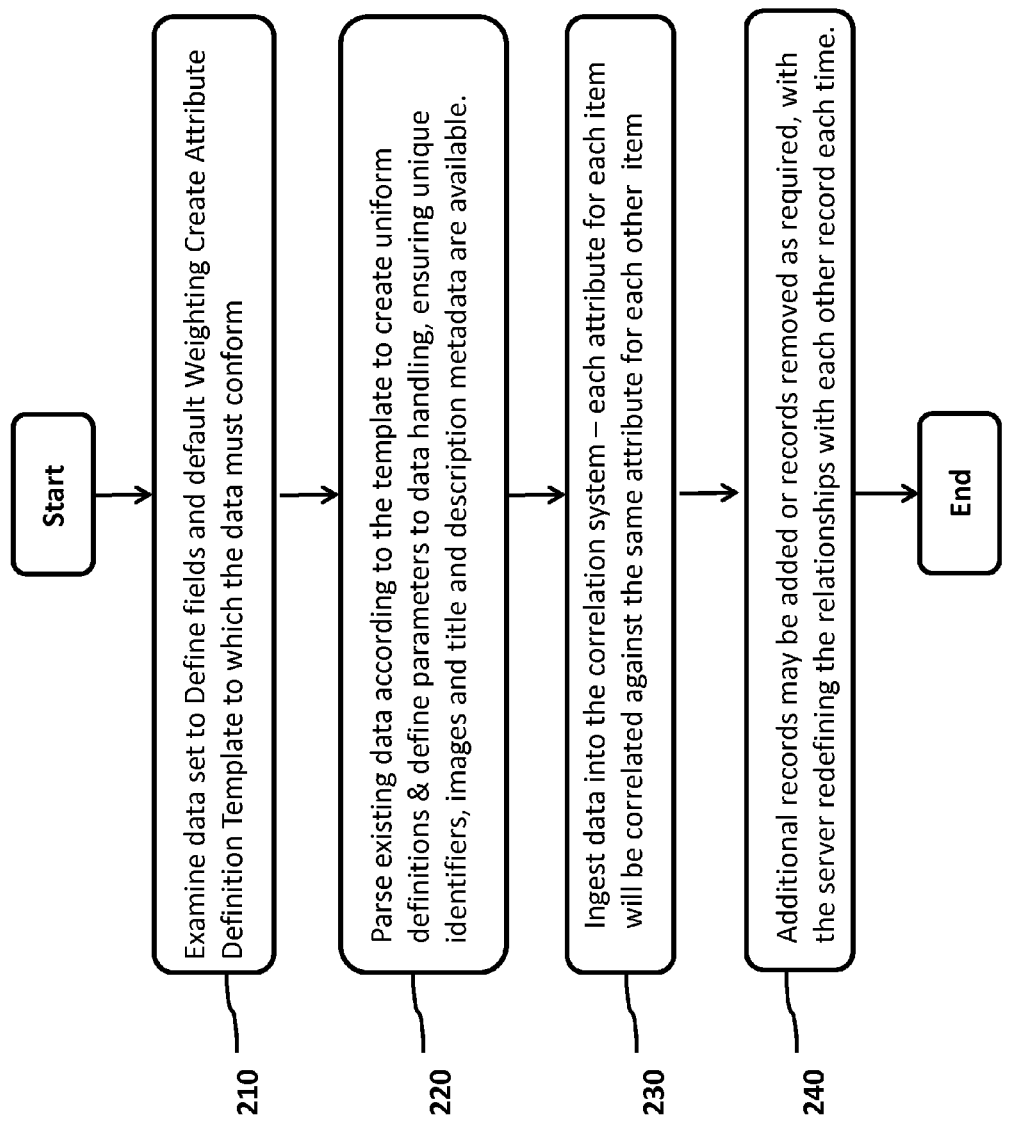
FIG. 2 is an exemplary flow chart describing the processing of data for storage into Database 103.

FIG. 2 illustrates an exemplary process for storing data related to the finite set of items and associations into Database 103. In a possible embodiment, Step 210 may define the data structure. This process is further explained in FIG. 3. Once the data structure is defined, there can be a step consisting of taking the existing data, and make it fit into a defined structure as described in Step 220. In Step 230, the conformed data can be ingested into Correlation Server 100 in such a way that each item is correlated against all other items. Lastly, Step 240 describes the possibility of adding or removing items as required while constantly and dynamically redefining relationships with each other item.

FIG. 3 provides two exemplary embodiments of the data structure of the system. Regardless of the type of data, there are some fields that are likely to be common regardless of the data set, though not necessarily related to the correlation process. These fields may include Unique Identifiers 301 and 321, Title 302 and 322, Description 303 and 323 and a universal resource locator for Visual Indicia, 304 and 324.

Moreover, there could be additional attributes that are different for each data set, which may be used to determine correlations and relationships between items in said data set. For example, Dataset 310, related to movies, may include data such as Rating 305, which may define the popularity, Genre 306 describing the category to which the item belongs, Director(s) 307 and Studio(s) 308.

As another example, using different type of data such as a retail example illustrated in Dataset 330, different attributes may apply, though there could be a number of common attributes, such as Unique ID 321, that may be used to uniquely identify each record, or other informational attributes such as Title 322, Description 323 and Image Universal Resource Locator 324 that may be used by the system for display. There may also be additional attributes that are different from other data sets. In one implementation, not all attributes will necessarily be used for correlation, such as for example, Universal Resource Locator 326. Additional fields used in correlation may include fields such as Rating 325, Price 327, Category 328 or Brand 329. In one implementation, each of the attributes described above can be categorized according to how it will be processed by the system and may have a default weight assigned based on how significant matches are for the each attribute. There are several different ways in which the attributes contribute to an overall correlation score.

In one embodiment, a popularity rating may be treated as a modification attribute, being a multiplier or as an addition to the overall score for a particular item. In this instance, popular items would then tend to be shown more often and be shown in a more prominent position on the display.

In another embodiment, an algorithm could be applied to gradually or step-wise increase the significance of a particular attribute, such as popularity, in the determination of what items to display. This would allow, for example, highly correlated items to be clustered around the reference item(s), though the determination of items further away from the reference items, becomes much less based on correlation with the reference items, and more defined by the fact that they are popular, or that the service provider wants them to be displayed regardless of the correlation score of the other attributes.

In one embodiment, attributes may contain a list of values. The order of values in said list may have significance. For example, in a hypothetical actors list, the main actors can be listed first, while bit-part or secondary actors are listed last. In this case, when determining the degree of correlation, certain items may be more significantly correlated if, for example, they share main actors as opposed to bit-part actors. Other attributes may be correlated based on an explicit text or numeric match. Many examples are possible and the person skilled in the art will be aware of that.

Figure 4:
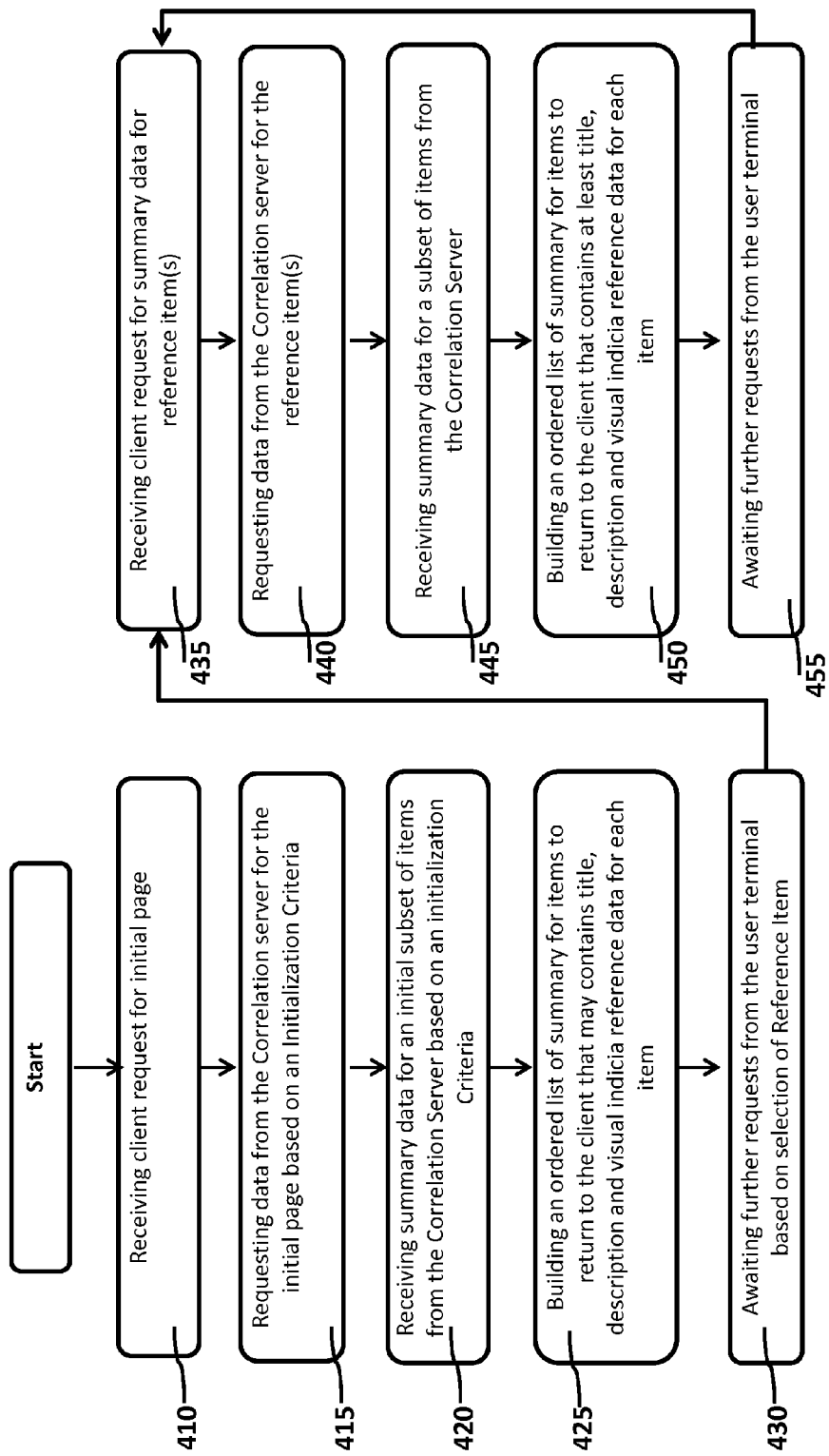
FIG. 4 is an exemplary flow chart describing some possible steps and actions performed by Client Server 105.

FIG. 4 is an exemplary flow chart describing the processing of requests by the Client Server 105. Step 410 describes a request for data received from a user terminal such as those described in FIG. 1 as 150, 151, 152, 153 or 154. In one embodiment, Client Server 105 may check a cache memory for the availability of the data matching the attributes of the request. If there is no cache available or no match, the request can be forwarded to the Correlation Server 100. It should be apparent to those skilled in the art that functions performed by Client Server 105 and Correlation Server 100, in addition to load balancing and cache, may be consolidated on a single server or be spread amongst multiple servers or devices.

In one embodiment, client devices, sometimes referred as user terminals, such as the ones depicted in FIG. 1 as 150, 151, 152, 153 and 154, store data and settings that can be transmitted to Client Server 105 along with the initial request for a subset of items as in Step 410.

In one embodiment, in Step 410. Client Server 105 receives a request from a user terminal to provide the summary data for an initial page, or alternatively to receive parameters for the client, or alternatively an explicit request for a particular named subset of items, such as "Default". In this instance, the response to the client can be predetermined, rather than calculated by Client Server 105.

In another embodiment, if no response to the client is predetermined, Client Server 105 may request data from the Correlation Server 100 as described in Step 415. When the client terminal application is first launched, initialization criteria is used to determine the starting point for the system to determine an initial set of items that will be displayed. A summary of this set of items can be returned to the user terminal as described in Step 420. For the initial screen, an initial representation criterion may used to define the layout of elements on the screen.

In one embodiment, a representation criterion is used to determine how the items are laid out on the display for each screen after the first. The representation criterion is defined in the user terminals with exemplary embodiments illustrated in FIGS. 5-8. It may be possible for a user to select and action an item directly from the initial display, though the discovery process from the initial screen is really initiated when the user has selected at least one reference item from that initial screen. Then, subsequent searches can be based on the said reference item(s) that the user has selected.

The configuration of an initial system client terminal screen may depend on the application for which it is being used and the initialization criteria may be defined in a number of ways, or combination of ways. Said initialization criteria can consist of one or a combination of the following non-limiting examples: 1) Manual or Host Driven Layout 2) Historical Data/Traditional Recommendation 3) User Defined 4) Traditional Search.

The aim for each of these methods is to define a starting point from which a user can initiate the discovery process. As it will be described hereafter, the system may also support the functionality of a user being able to weight relationships between items. Alternatively, or in addition, a service provider may provide default weights.

A Manual or Host Driven Layout is an example of predefined initialization criteria. In many instances, there can be the necessity to present users with a defined set of items from which they can choose. The system may provide a mechanism to allow manual definition of a home screen for users. In this instance, the items can be manually placed, or at least partially manually placed, so that all users start from a similar configuration and similar options. Users may also be provided with a simple mechanism to return to the home screen, or to navigate back or forward through the reference item selections they have made.

In one embodiment, the home screen may be providing a relatively small number of categories from which a user can select. The subsequent items presented to the user can be based, at least in part, on the relationships built from an initial reference item selected at the initial screen.

For example, in the case of an initial screen for a movie selection service, as the visual indicia displayed for each item represents a rich set of data corresponding to an item, a service provider may elect to show images representing all the main genres as a picture or in text form, along with some current popular titles. Once the user selects a new reference item, the system will perform a relationship search based on the new reference item selection. In a retail model, in addition to showing categories broadly defining items such as "Apparel", categories could be shown such as "Specials" or "Hot Items".

Historical Data/Traditional Recommendations are examples of analytics initialization criteria. An initial screen can be augmented by usage data, either personalized, using data pertinent to the specific user, or using data aggregation of many users. For example, currently popular titles can be elevated to the home screen in a given location. In addition, purchasing habits may also be used to affect the initial landing screen.

The system may also allow users to customize their own initial pages by, for example, explicit placement of items or items representing categories at particular parts of the screen, or more simply by prioritizing certain types of content or applying filters. For example, prioritizing children's content, or filtering out certain categories to ensure that are never shown as an option, e.g., adult movies.

In another embodiment, users can be provided with an option to start the discovery process with a traditional search that could be text based. The result of said search may find items that match said search and build and represent associations around said search results.

In another embodiment the search could be based on particular attributes belonging to the data set. In an attribute based search, the user can be shown the attributes of the data stored in the system and be allowed to select one or more of these attributes, along with values of those attributes that they wish to find and/or exclude. For example, they may select a movie "Genre" as an attribute, and "Sci-Fi" as a search criterion.

In one embodiment, an initial request from a client or user terminal may prompt Client Server 105 and Correlation Server 100 to return a response based on using an initialization criterion to generate an initial ordered subset of items. Subsequent requests from a client terminal to Client Server 105 may be based on a reference item or items selected from the said initial subset of items. This is illustrated in Step 435 and Step 440.

Correlation Server 100 may then return summary data for these items to Client Server 105 as described in Step 445. In one embodiment, the data returned from Correlation Server 100 in Step 445 may include at least a reference item or items and an aggregate score for each attribute for each of the items in the subset of items returned. In step 450, the Client Server 105 builds an ordered list of items received in Step 445.

In one embodiment, the number of items in the ordered list returned to the client terminal may be predefined. In other instances, the client may request a particular number of items, with Client Server 105 requesting a related number from the Correlation Server 100. The client terminal need not display all the data returned to it by Client Server 105.

In one embodiment, as described in Step 425 and Step 450, Client Server 105 may build an ordered list of items to return to the client terminal device. These steps may, in some embodiments, involve the Client Server 105 applying weights or modifiers to attributes of the data returned from Correlation Server 100 in order to determine the order of items to be returned to the client terminal device. The client terminal device will use this data, along with the representation predetermined criteria to layout the items on the display in the order they appear in the list returned from the Client Server 105. In Step 455 and Step 430, Client Server 105 may await requests for new requests from the client terminal device, which are received in Step 435.

Figure 5:
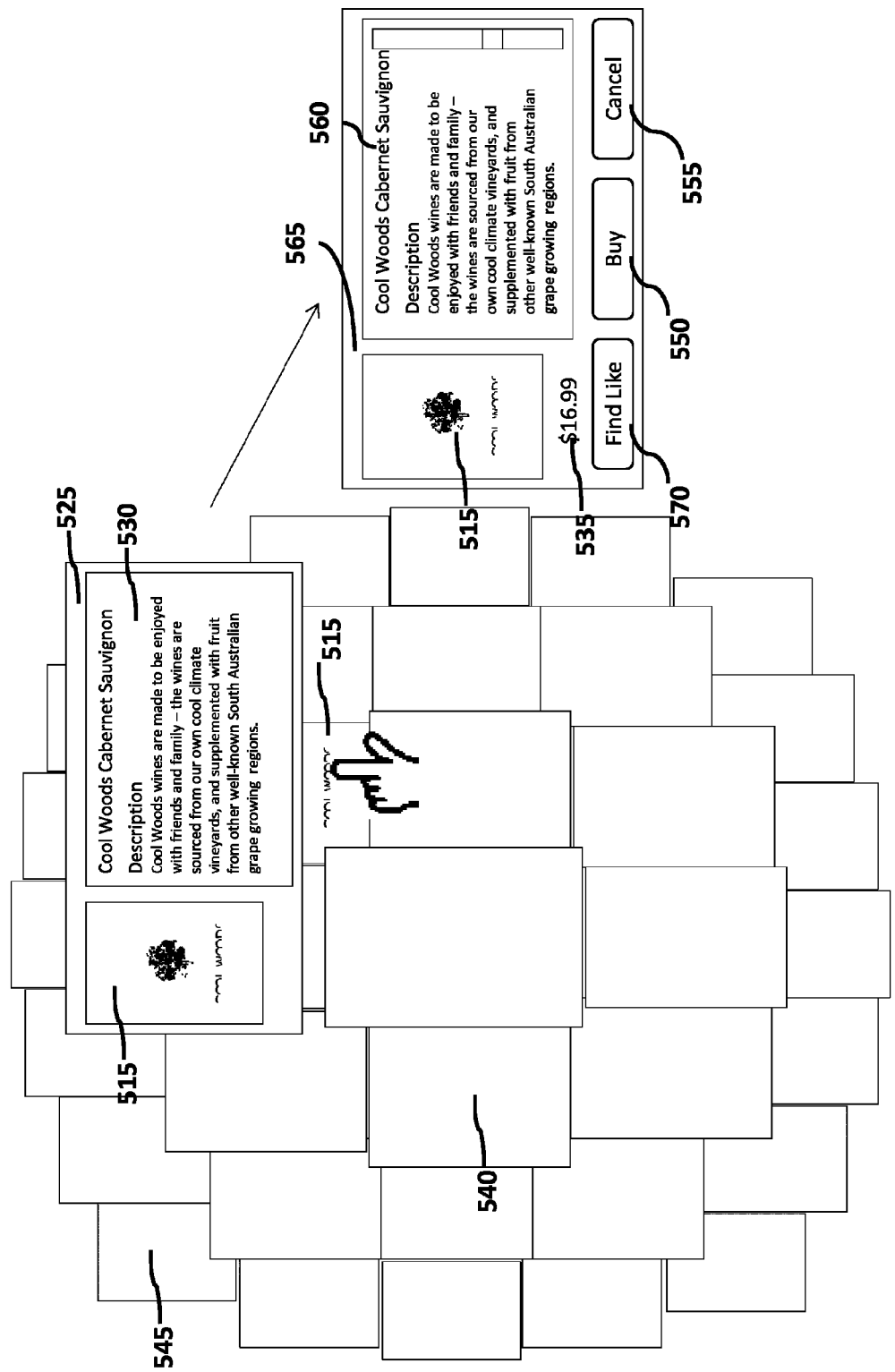
FIG. 5 is a schematic diagram of an exemplary embodiment of the user experience when an item is selected on a client device.

FIG. 5 illustrates an exemplary embodiment of a client terminal user interface. In this embodiment, the user interface is organized around Reference Visual Indicia 510 representing a single current reference item. In this embodiment, Reference Visual Indicia 510 is closely surrounded by other images such as Visual Indicia 540 that may represent items that may have a strong relationship with Reference Visual Indicia 510, represented by their close proximity to the central Visual Indicia 510.

In the example of FIG. 5, another way of representing degrees of correlation is the size of the images. In this example, Visual Indicia 540 is of a smaller size as compared to the Reference Visual Indicia 510. As the correlation of items reduces, so the size may be reduced accordingly. This is represented in FIG. 5 by comparing the size of Visual Indicia 540 with the size of Visual Indicia 545.

The person skilled in the art may recognize that size and proximity are just examples. Many techniques can be employed to represent correlation. For example, peripheral elements such as Visual Indicia 545 may also be made more and transparent to de-emphasize them and help to manage the visual impact deriving from having too many items for display on a screen.

In a one embodiment, the process of browsing the images will provide users with additional information about the item they are currently browsing as, for example, in Table 525. The process of browsing the items can be different according to the type of client device. For example, on an interface device such as a tablet or Smartphone, dragging a finger over the images may display additional information as in Table 525. This information may move with the user's finger showing some level of detail for the currently selected item. This can be as little as a full size version of the related Visual Indicia 515, or may include, but is not limited to, showing additional information such as the item's Title and Description 530.

In one embodiment, when an item is selected, an Additional Information Window 565 may be displayed. Window 565 may provide additional details and may prompt the user to take actions related to the selected item. The additional information displayed in Window 565, in some embodiments, may be requested by the user terminal from Client Server 105 in a process separate from the previous level of detail displayed in Table 525 that can be provided and cached as part of the response to the initial request. This allows more detail to be shown, such as a Price 535, or a more detailed Description 560 without burdening the initial set of data sent by Client Server 105 to the client terminal with unnecessary information.

In addition to providing richer detail on the item, Window 565, in one embodiment, may provide a number of alternative actions that the user can take. These alternatives may include as mere examples an option to select the item as a new reference item 570, Cancel the selection 555 and close Window 565, Buy the item 550 or perform other specific actions according to the context of the implementation such as play a movie, open a book or other.

In one embodiment, visual indicia are conformed to be the same height and width ratio for a better user experience. This ratio may also not necessarily relate to the original visual indicia dimensions, as they may be cropped and/or scaled to fit the desired form factor on the display. In one embodiment, visual indicia can be squared or rectangular, though could also be any two-dimensional shape, such as a hexagon or a three dimensional shape such as a cube of sphere.

In one embodiment of the system, multiple instances of what would normally constitute full screen display as described in FIGS. 5 through 8, may be displayed on the screen simultaneously, each representing individual groups of items. As with the user interfaces described earlier, relative proximity, size and transparency can be used to indicate the relationship these groups of items would have with each other.

In another embodiment, the displayed information may effectively be a window on to a much larger set of data, where the user can move the window over that larger data set to see more information. Such techniques may also be employed as the user navigates to particular parts of the screen, the data being displayed may be shifted to allow the elements that the user is examining to be moved closer to the center of the screen, and more data appear around the area that they are browsing. It should be evident to a person skilled in the art that there are many other user interface techniques that may be employed to graphically represent the relationships between items and allow a user to navigate those relationships.

Figure 6:
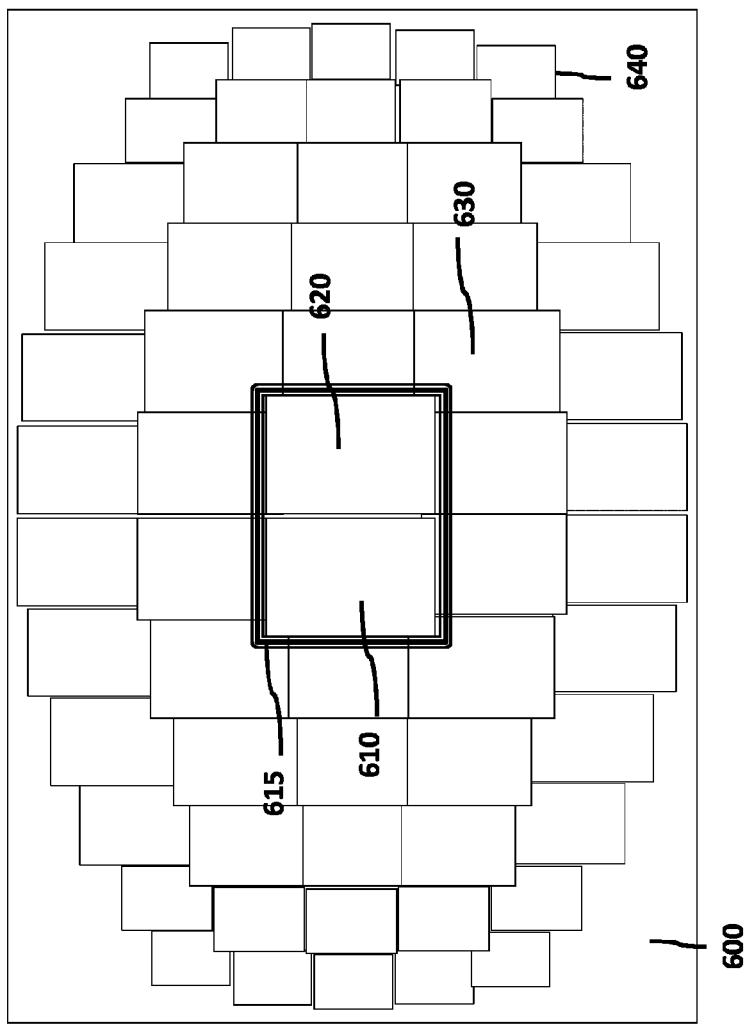
FIG. 6 is a schematic diagram of another exemplary embodiment of the layout of visual indicia on the client device.

FIG. 6 illustrates an exemplary embodiment for an alternate user interface layout, for the system Display 600, that is similar to the layout described in FIG. 5. The difference is that it supports multiple reference items. In the case of 600, Reference Item 610 and Reference Item 620 are placed in the center of the screen.

In one embodiment, reference items can be added or removed by dragging them in or out of the center of the screen. In this instance, Reference Items 610 and 620 may need to be differentiated from the other items by more than the previous examples where size and position were used. For example, Border 615 can be used to highlight the Reference Items 610 and 620, with item 630 representing an item with strong association with said reference items. As illustrated in FIG. 5, in one embodiment, the relationship of items less related to multiple References Items 610 and 620 can be illustrated by using transparency, reduced size and increased distance from the central items as illustrated by Visual Indicia 640.

In one embodiment, the user interface may allow for there to be no selected Reference Items, which may return the system to the initial state. In one embodiment, the act of dragging an item toward the center of the screen may result in the visual effect of all the items on the screen moving along with the selected item, and then once the selected item is dragged to the center, it may snap into place becoming a new reference item.

Figure 7:
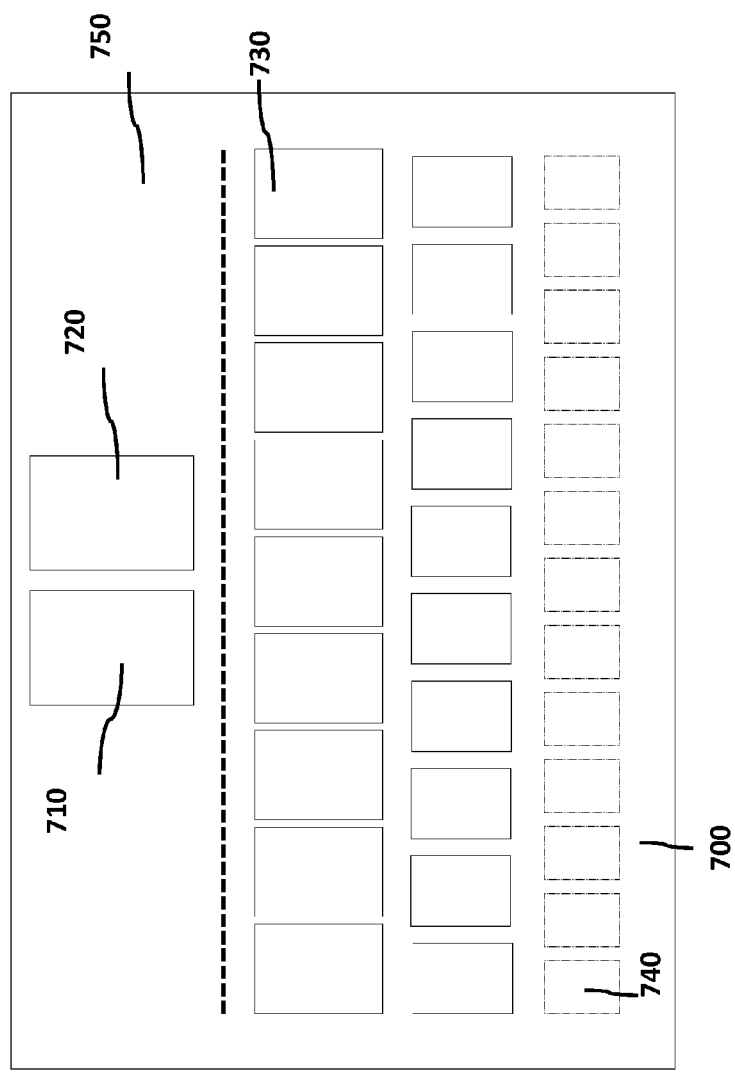
FIG. 7 is a schematic diagram of a third exemplary embodiment of the layout of visual indicia on the client device.

FIG. 7 illustrates an alternate user interface layout Display 700 for the system. In this example, Reference Items 710 and 720 may be placed in a particular section of the display; either on the top, left, right or bottom, and content relationships can be illustrated at least by size and proximity. In one embodiment, strongly related items such as Visual Indicia 730 are displayed in close proximity to the Reference Items 710 and 720, while less related items, such as Visual Indicia 740, are illustrated by being further away from the Reference item, or by being smaller or by having some degree of transparency.

In this and other instances, related items may also be animated, moving or replaced periodically with new content, introducing a temporal component to the selection process. In one embodiment, Reference Items 710 and 720 may be removed by dragging them out of the Reference Item Selection Area 750, and new reference items may be selected by dragging them to this area. In another embodiment, the reference item selection may be identical to that described in FIG. 5.

Figure 8:
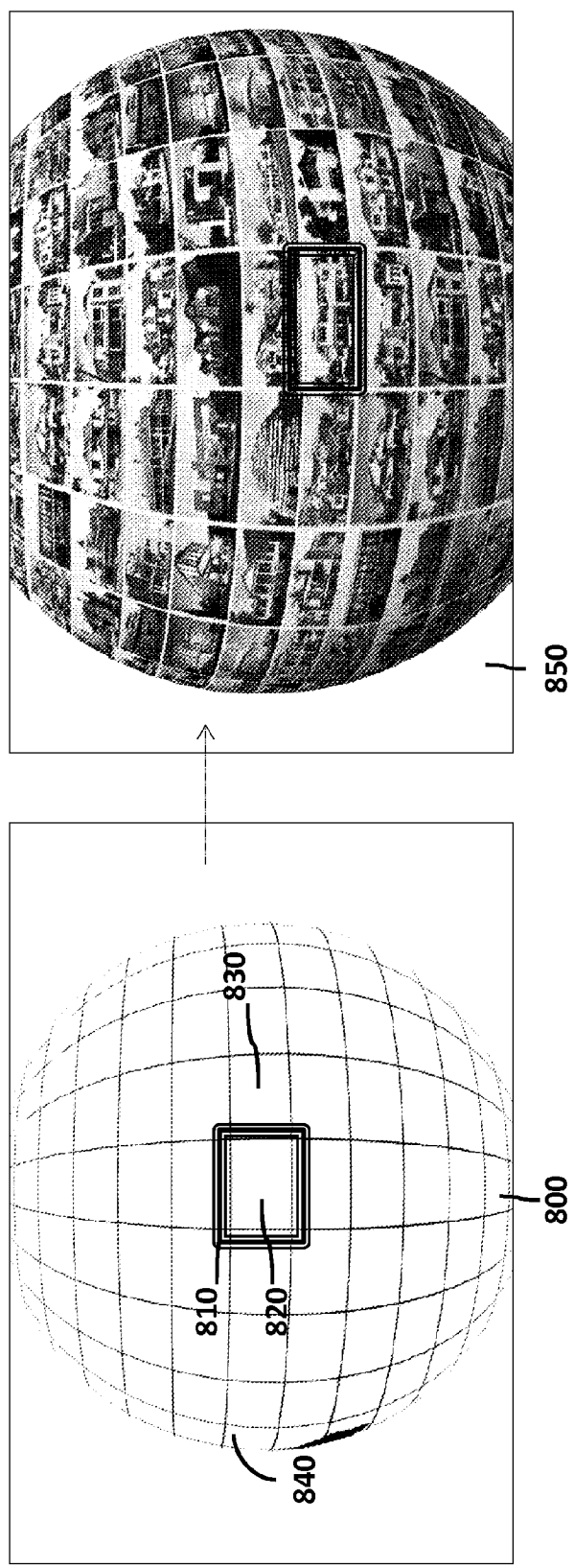
FIG. 8 is a schematic diagram of a fourth exemplary embodiment of the layout of visual indicia on the client device.

FIG. 8 illustrates an alternate user interface layout for the system, whereby images are mapped onto a 3D surface such as Sphere 800 or other curved surface such as a concave or convex cylinder, where the images would appear skewed. In these instances, Reference Item 820 may be highlighted in some way to show differentiation, for example, with Border 810 or other mechanism. In one embodiment, items in close proximity such as Visual Indicia 830 will typically be closely associated with Reference Item 820, while items such as Visual Indicia 840 that are less correlated to Reference Item 820 may appear peripheral. Item 850 illustrates the user interface with images mapped on a sphere. In one embodiment, interaction with the user interface 850 may involve rotating or moving the sphere or curved surface so that an item is selected as a reference item by moving it to a particular part of the screen, such as the center.

It should be apparent to those skilled in the art that elements of the user interface concepts described in FIG. 5 through FIG. 8 may be combined together in different ways to build a plurality of user experience designs that have a common purpose.

Figure 9:
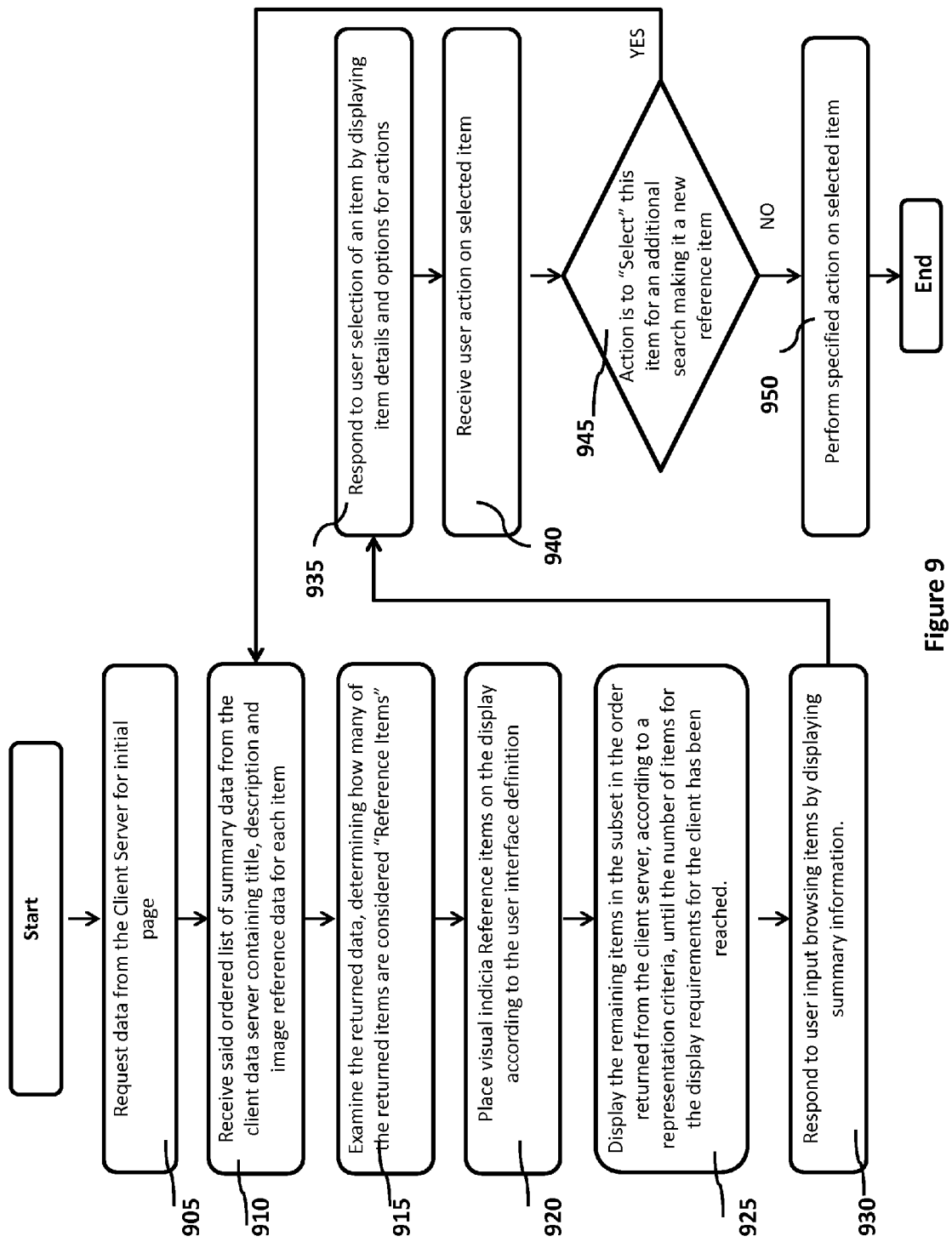
FIG. 9 is an exemplary flow chart describing possible steps and actions performed by user terminal devices such as 150, 11, 152, 153 and 154.

FIG. 9 is an exemplary flow chart that describes processes, requests and functions that may be performed by client terminal devices such as those represented in FIG. 1 by elements 150, 151, 152, 153 and 154.

Step 905 describes a terminal device requesting to Client Server 105 an initial page, and in one embodiment, settings from the user. These settings may include filters or weights that may be applied and influence the correlation scores, that may affect both the subset of items returned to the client, and the order in which the items will be displayed.

Step 910 describes an ordered list returned to the client, which in one embodiment contains the title, description and an image reference data for each Visual Indicia.

Step 915 describes examining the returned data and determining how many of the returned items are reference items.

Step 920 describes placing visual indicia of reference items on the display according to the user interface definition.

Step 925 describes placing the remaining items that will fit on the display according to how client is configured. A user may be able to zoom in and out of the display, showing more or less items on the display. In one embodiment, items will be displayed in the order defined in the list of items returned from Client Server 105. In another embodiment, the client terminal may make part or all of the determination as to the order in which to display items.

Once the items are displayed, a user may be able to navigate around the items according to the user interface of the client device for example by using a mouse, touchpad, or other pointing device.

Step 930 describes the possibility of displaying additional detail about each item by opening for example Table 525 described in FIG. 5.

Step 935 describes the possibility of displaying an item's details and options for actions as described in Window 565 of FIG. 5.

Step 940 describes the client terminal receiving a user selection.

Step 945 illustrates a decision point regarding the type of action selected. One possible option is to select the item as a new reference item, initiating a new search, and receiving a new set of data from the Client Server 105 (Step 910). Step 950 represents the other possible actions that may be taken on the selected item may include, canceling the selection, getting even more detailed information, purchasing the item, or other functions based on the implementation.

Figure 10:
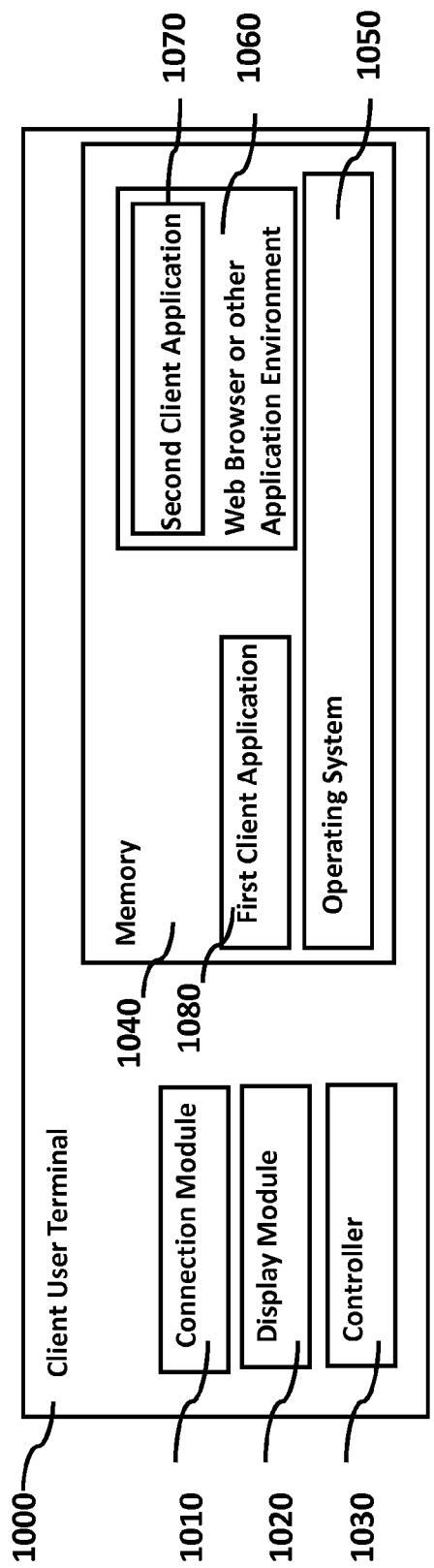
FIG. 10 is an exemplary schematic representation of a possible Client User Terminal 1000 device.

FIG. 10 is an exemplary schematic representation of a client user terminal such as 150, 151, 152, 153 and 154. Client User Terminal 1000 is a hardware device that may have a Connection Module 1010 connecting the device to an IP network via a fixed technology such as Ethernet, or Wireless technology such as Wi-Fi, or cellular network technology such as LTE as mere examples. Client User Terminal 1000 will also include a Display Module 1020, which enables the display of graphical information, a Controller 1030, a Memory 1040 storing software applications.

Client User Terminal 1000 may have an Operating System 1050 stored in Memory 1040 on which applications may be executed. Memory 1040 may have areas or blocks storing information and software such as 1070, 1060, 1080 and 1050, apt to implement some of the embodiments described in the present invention.

The person skilled in the art will understand that in order to enjoy the benefits of the present invention on a portable or fixed device, said device may host client software such as a dedicated software application First Client Application 1080 running on top of the device's operating system 1050. In another embodiment, the client terminal code may be executed within a web browser or other application execution environment such as HTML/Javascript or Flash 1060, so that no specific software need be installed in the client to run the Second Client Application 1070. It will be apparent to the person skilled in the art that FIG. 10 is a proxy for a wide variety of apparatuses and the examples depicted in FIG. 1 are just a tiny fraction of the whole spectrum of possibilities. For example, a connected refrigerator with a display may use the present invention to place orders at a local supermarket. Displays can be substituted with augmented reality interface or virtual displays.

Without in any way limiting the scope, interpretation, or application of the claims appearing below, a technical effect of one or more of the example embodiments disclosed herein could be the development of connected hardware apparatuses capable of providing new or improved services. For example a food refrigerator could be sensing what kind of items are stored in the refrigerator, for example by means of RF-ID and provide an interface for ordering missing items implementing some of the embodiments that have been disclosed in the present application.

Embodiments of the present invention may be implemented in software, hardware, application logic or a combination of software, hardware and application logic. The software, application logic and/or hardware may reside on a single server or multiple servers. If desired, part of the software, application logic and/or hardware may reside on a client server, part of the software, application logic and/or hardware may reside on a correlation server, and part of the software, application logic and/or hardware may reside on a user terminal or client terminal. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 10. A computer-readable medium may comprise a computer-readable storage medium that may be any media or means that can contain or store the instructions for use by or in connection with an instruction execution system, apparatus, or device, such as a computer. For the purposes of the present application a "plurality" shall mean "one or more".

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments of the invention, these descriptions should not be viewed in a limiting sense. Rather, there are several variations and modifications, which may be made without departing from the scope of the present invention as defined in the appended claims.

What is claimed is:

1. An apparatus, comprising:
   at least one processor; and at least one non-transitory computer-readable medium including computer program code; the at least one non-transitory computer-readable medium and the computer program code configured to, with the at least one processor, cause the apparatus to perform at least the following:
   determining a degree of correlation by means of a correlation algorithm between items belonging to a finite set of items, wherein each item has at least associated predefined visual indicia and at least a set of additional predefined attributes describing the item that are common to every other item belonging to said finite set of items to inform the process of discovery of said items within said finite set, wherein values of said additional predefined attributes are used to generate said degree of correlation;
   generating an aggregate score representative of said degree of correlation of at least one attribute of every item against all other said items belonging to said finite set via a weighting algorithm;
   causing the display of at least one reference item among said finite set of items via its associated visual indicia; and
   causing the display of a plurality of additional items belonging to said finite set of items via its associated visual indicia according to a representation criterion, wherein said representation criterion is indicative, at least in part, of said aggregate score.

2. The apparatus of claim 1, wherein:
   the at least one processor; and the at least one non-transitory computer-readable medium including computer program code; the at least one non-transitory computer-readable medium and the computer program code configured to, with the at least one processor, cause the apparatus to additionally perform at least the following:
   causing the creation of a new set of said items upon the selection of at least one new reference item from said additional items.

3. The apparatus of claim 2, wherein:
   the at least one processor; and the at least one non-transitory computer-readable medium including computer program code; the at least one non-transitory computer-readable medium and the computer program code configured to, with the at least one processor, cause the apparatus to additionally perform at least the following:
   arranging the display of said new set of items via their associated predefined visual indicia in relation to said new reference item according to said representation criterion.

4. The apparatus of claim 2, wherein said creation of said new set is based, at least in part, on at least one modification attribute of said finite set of items.

5. The apparatus of claim 2, wherein said creation of said new set is based, at least in part, on a weight parameter associated to at least one of said additional predefined attributes of said finite set of items.

6. The apparatus of claim 1, wherein said representation criterion is based on relative proximity.

7. The apparatus of claim 1, wherein said representation criterion is based on relative size.

8. A computer software system having a set of instructions stored in a non-transitory computer-readable medium for controlling at least one general-purpose digital computer in performing desired functions that are necessary to execute a machine implemented method, said set of instructions comprising instructions formed into each of a plurality of modules, each modules comprising:
   a) a process for determining the degree of correlation by means of a correlation algorithm between items belonging to a finite set of items, wherein each item has at least associated predefined visual indicia and at least a set of additional predefined attributes describing the item that are common to every other item belonging to said finite set of items to inform the process of discovery of said items within said finite set; wherein values of said additional predefined attributes are used to generate said degree of correlation;
   b) a process for generating an aggregate score representative of said degree of correlation of at least one attribute of every item against all other said items belonging to said finite set via a weighting algorithm;
   c) a process for causing the display of at least one first reference item among said finite set of items via its associated visual indicia; and
   d) a process for causing the display of a plurality of additional items belonging to said finite set of items via its associated visual indicia according to a representation criterion, wherein said representation criterion is indicative, at least in part, of said aggregate score.

9. The computer software system of claim 8, further comprising:
   a process for causing the creation of a new set of said items upon the selection of at least one new reference item from said additional items.

10. The computer software system of claim 9, further comprising:
    a process for arranging the display of said new set of items via their associated predefined visual indicia in relation to said new reference item according to said representation criterion.

11. The computer software system of claim 9, wherein said creation of said new set is based, at least in part, on at least one modification attribute of said finite set of items.

12. The computer software system of claim 9, wherein said creation of said new set is based, at least in part, on a weight parameter associated to at least one of said additional predefined attributes of said finite set of items.

13. The computer software system of claim 8, wherein said representation criterion is based on relative proximity.

14. The computer software system of claim 8, wherein said representation criterion is based on relative size.

15. A machine implemented method comprising:
    determining a degree of correlation by means of a correlation algorithm between items belonging to a finite set of items, wherein each item has at least associated predefined visual indicia and at least a set of additional predefined attributes describing the item that are common to every other item belonging to said finite set of items to inform the process of discovery of said items within said finite set; wherein values of said additional predefined attributes are used to generate said degree of correlation;
    generating an aggregate score representative of said degree of correlation of at least one attribute of every item against all other said items belonging to said finite set via a weighting algorithm;
    causing the display of at least one reference item among said finite set of items via its associated visual indicia; and
    causing the display of a plurality of additional items belonging to said finite set of items via its associated visual indicia according to a representation criterion, wherein said representation criterion is indicative, at least in part, of said aggregate score.

16. The machine implemented method of claim 15, further comprising:
causing the creation of a new set of said items upon the selection of at least one new reference item from said additional items.

17. The machine implemented method of claim 16, further comprising:
arranging the display of said new set of items via their associated predefined visual indicia in relation to said new reference item according to said representation criterion.

18. The machine implemented method of claim 16, wherein said creation of said new set is based, at least in part, on at least one modification attribute of said finite set of items.

19. The machine-implemented method of claim 16, wherein said creation of said new set is based, at least in part, on a weight parameter associated to at least one of said additional predefined attributes of said finite set of items.

20. The machine implemented method of claim 15, wherein said representation criterion is based on relative proximity.

* * * * *